United States Patent
Hindi et al.

(10) Patent No.: US 11,663,602 B2
(45) Date of Patent: May 30, 2023

(54) METHOD AND APPARATUS FOR REAL-TIME FRAUD MACHINE LEARNING MODEL EXECUTION MODULE

(71) Applicant: JPMorgan Chase Bank, N.A., New York, NY (US)

(72) Inventors: Faeiz Hindi, Montclair, NJ (US); Ramana Nallajarla, Hockessin, DE (US); Sambasiva R. Vadlamudi, Chadds Ford, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 881 days.

(21) Appl. No.: 16/413,085

(22) Filed: May 15, 2019

(65) Prior Publication Data

US 2020/0364718 A1 Nov. 19, 2020

(51) Int. Cl.
*G06Q 20/40* (2012.01)
*G06N 5/043* (2023.01)
*G06N 20/20* (2019.01)

(52) U.S. Cl.
CPC ........ *G06Q 20/4016* (2013.01); *G06N 5/043* (2013.01); *G06N 20/20* (2019.01)

(58) Field of Classification Search
CPC ..... G06Q 20/4016; G06N 20/20; G06N 5/043
See application file for complete search history.

(56) References Cited

U.S. PATENT DOCUMENTS

| | | | |
|---|---|---|---|
| 10,223,691 B2 | 3/2019 | Katzin et al. | |
| 2011/0055078 A1 | 3/2011 | Nandy | |
| 2011/0295722 A1 | 12/2011 | Reisman | |
| 2015/0170147 A1 | 6/2015 | Geckle et al. | |
| 2016/0086185 A1* | 3/2016 | Adjaoute | G06Q 20/4016 705/44 |
| 2017/0364918 A1* | 12/2017 | Malhotra | G06Q 40/02 |
| 2019/0095924 A1* | 3/2019 | Adjaoute | G06Q 20/4016 |
| 2020/0252802 A1* | 8/2020 | Pachauri | H04W 8/26 |

OTHER PUBLICATIONS

Official communication (Search Report and Opinion) in W.I.P.O Patent Application No. PCT/US2020/32951, dated Jul. 29, 2020.

* cited by examiner

*Primary Examiner* — Kamran Afshar
*Assistant Examiner* — Marshall L Werner
(74) *Attorney, Agent, or Firm* — Greenblum & Bernstein, P.L.C.

(57) ABSTRACT

Various methods, apparatuses, and media for implementing a fraud machine learning model execution module are provided. A processor generates a plurality of machine learning models. The processor generates historical aggregate data based on prior transaction activities of a customer from a plurality of databases for transactions. The processor also tracks activities of the customer during a new transaction authorization process and generates a transaction data; integrates the transaction data with the historical aggregate data; executes each of said machine learning models using the integrated transaction data and the historical aggregate data to generate a fraud score and stores the fraud score into the memory; and determines whether the new transaction is fraudulent based on the generated fraud score.

12 Claims, 4 Drawing Sheets

METHOD AND APPARATUS FOR REAL-TIME FRAUD MACHINE LEARNING MODEL EXECUTION MODULE

TECHNICAL FIELD

This disclosure generally relates to a real-time fraud machine learning module, and, more particularly, to methods and apparatuses for implementing a real-time fraud machine learning model execution module for improving detection of fraudulent transactions in real-time.

BACKGROUND

Unfortunately, fraudulent transactions are in the rise in today's economy. For example, as credit card (or the like) use increases in recent years, fraud and credit abuse cases are on the rise as well. A significant portion of the financial losses due to fraud transactions and credit abuse, however, usually rest on the card issuers, e.g., banks. Major card issuers typically absorb hundreds of thousands of dollars in fraud losses every month.

A number of solutions have been proposed or implemented to fight fraud and credit abuse. However, regardless of strong fraud prevention decision engines, fraud may happen, for example, stolen cards may be used at merchant and authorization and transactions may get approved because these conventional fraud prevention decision engines may not be configured to detect fraudulent transactions in real-time. Typical fraud models may be deployed on expensive, centralized mainframe computers handling may be only a single source of data which make them inefficient and incapable of detecting fraudulent transactions in real-time. These conventional fraud models may not be frequently updated because these models have to be manually recoded.

In view of the foregoing, it would be desirable to provide a solution for detecting and processing fraud and credit abuse which overcomes the above-described deficiencies and shortcomings.

SUMMARY

The present disclosure, through one or more of its various aspects, embodiments, and/or specific features or sub-components, provides, inter alia, various systems, servers, devices, methods, media, programs, and platforms for implementing a real-time fraud machine learning module for improving detection of fraudulent transactions in real-time. The various aspects, embodiments, features, and/or sub-components provide optimized processes of implementing a real-time fraud machine learning module (RTFMLM) in which the generated proprietary real-time fraud detection model (FDM) may handle a large number of data sets and multiple data sources required by machine learning models, executing the FDMs in real-time using transaction data from various products and channels. FDM's proprietary distributed parallel architecture, according to exemplary embodiments, may enable immediate, controlled promotion of FDMs to test and production, leveraging extensible markup language (XML) and plain old Java objects (POJOs), thereby eliminating the need to manually recode model changes and allowing FDMs to be updated in a more frequent manner (e.g., weekly, per three days, or per day, etc. basis). RTFMLM may comprise of compute clusters that implement proprietary machine learning algorithms, using strategic commodity hardware and open-source software reducing overall cost of operations. RTFMLM's architecture may allow it to interact with any existing fraud detection system and may be fully integrated with existing transactions processing infrastructure, e.g., existing credit card (or the like) processing infrastructure.

According to an aspect of the present disclosure, a method for implementing a fraud machine learning model execution module to detect fraudulent transactions by utilizing one or more processors and one or more memories, the method may include: generating, by one or more processors, a plurality of machine learning models, each of said machine learning models is configured to run simultaneously in parallel independent of each other; generating, by the one or more processors, historical aggregate data based on prior transaction activities of a customer from a plurality of databases for transactions; tracking, by the one or more processors, activities of the customer during a new transaction authorization process and generating a transaction data; integrating, by the one or more processors, the transaction data with the historical aggregate data; executing, by the one or more processors, each of said machine learning models using the integrated transaction data and the historical aggregate data to generate a fraud score; and determining, by the one or more processors, whether the new transaction is fraudulent based on the generated fraud score.

According to another aspect of the present disclosure, the method may further include: authorizing the new transaction based on a determination that the fraud score is a value that is at or above a predetermined threshold.

According to yet another aspect of the present disclosure, the method may further include: denying the new transaction based on a determination that the fraud score is a value that is below a predetermined threshold.

According to an aspect of the present disclosure, the method may further include: using predictive model markup language (PMML) as an open source framework to model each of said plurality of machine learning models.

According to another aspect of the present disclosure, the method may further include: updating each of said plurality of machine learning models by automatically incorporating model changes, due to the integration of the transaction data with the historical aggregate data, without recoding the model changes.

According to a further aspect of the present disclosure, the method may further include: using any one of the following as an open source framework to model each of said plurality of machine learning models: Java Spring Boot, Cassandra, LogStash, Kibana, and Kafka.

According to yet another aspect of the present disclosure, the method may further include: updating each of said plurality of machine learning models by automatically incorporating model changes by using a predictive model markup language (PMML) as an open source framework; generating a new model based on the updates; and executing the new model in a simulation mode prior to executing each of said machine learning models.

According to yet another aspect of the present disclosure, the method may further include: updating each of said plurality of machine learning models by automatically incorporating model changes by using a predictive model markup language (PMML) as an open source framework; generating a new model based on the updates; storing the new model onto a memory; and utilizing the new model to retrain each of said machine learning models.

According to a further aspect of the present disclosure, a system for implementing a fraud machine learning model execution module to detect fraudulent transactions is disclosed. The system may include a processor, a memory, and a server interconnected via one or more communication networks. The processer may be configured to: generate a plurality of machine learning models, each of said machine learning models is configured to run simultaneously in parallel independent of each other; generate historical aggregate data based on prior transaction activities of a customer from a plurality of databases for transactions; track activities of the customer during a new transaction authorization process and generating a transaction data; integrate the transaction data with the historical aggregate data; execute each of said machine learning models using the integrated transaction data and the historical aggregate data to generate a fraud score and store into the memory; and determine whether the new transaction is fraudulent based on the generated fraud score.

According to yet another aspect of the present disclosure, the processor may be further configured to: authorize the new transaction based on a determination that the fraud score is a value that is at or above a predetermined threshold.

According to other aspect of the present disclosure, the processor may be further configured to: deny the new transaction based on a determination that the fraud score is a value that is below a predetermined threshold.

According to yet another aspect of the present disclosure, the processor may be further configured to model each of said plurality of machine learning models by using predictive model markup language (PMML) as an open source framework.

According to an aspect of the present disclosure, the processor may be further configured to: update each of said plurality of machine learning models by automatically incorporating model changes, due to the integration of the transaction data with the historical aggregate data, without recoding the model changes.

According to yet another aspect of the present disclosure, the processor may be further configured to: model each of said plurality of machine learning models by using any one of the following as an open source framework: Java Spring Boot, Cassandra, LogStash, Kibana, and Kafka.

According to another aspect of the present disclosure, the processor may be further configured to: update each of said plurality of machine learning models by automatically incorporating model changes by using a predictive model markup language (PMML) as an open source framework; generate a new model based on the updates; and execute the new model in a simulation mode prior to executing each of said machine learning models.

According to yet another aspect of the present disclosure, the processor may be further configured to: update each of said plurality of machine learning models by automatically incorporating model changes by using a predictive model markup language (PMML) as an open source framework; generate a new model based on the updates; store the new model onto the memory; and utilize the new model to retrain each of said machine learning models.

According to an aspect of the present disclosure, a non-transitory computer readable medium is disclosed. The non-transitory computer readable medium may be configured to store instructions for implementing a fraud machine learning model execution module to detect fraudulent transactions, wherein when executed, the instructions cause a processor to perform the following: generating a plurality of machine learning models, each of said machine learning models is configured to run simultaneously in parallel independent of each other; generating historical aggregate data based on prior transaction activities of a customer from a plurality of databases for transactions; tracking activities of the customer during a new transaction authorization process and generating a transaction data; integrating the transaction data with the historical aggregate data; executing each of said machine learning models using the integrated transaction data and the historical aggregate data to generate a fraud score; and determining whether the new transaction is fraudulent based on the generated fraud score.

According to another aspect of the present disclosure, the instructions may further cause the processor to perform the following: authorizing the new transaction based on a determination that the fraud score is a value that is at or above a predetermined threshold.

According to yet another aspect of the present disclosure, the instructions may further cause the processor to perform the following: denying the new transaction based on a determination that the fraud score is a value that is below a predetermined threshold.

According to another aspect of the present disclosure, the instructions may further cause the processor to perform the following: using predictive model markup language (PMML) as an open source framework to model each of said plurality of machine learning models.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
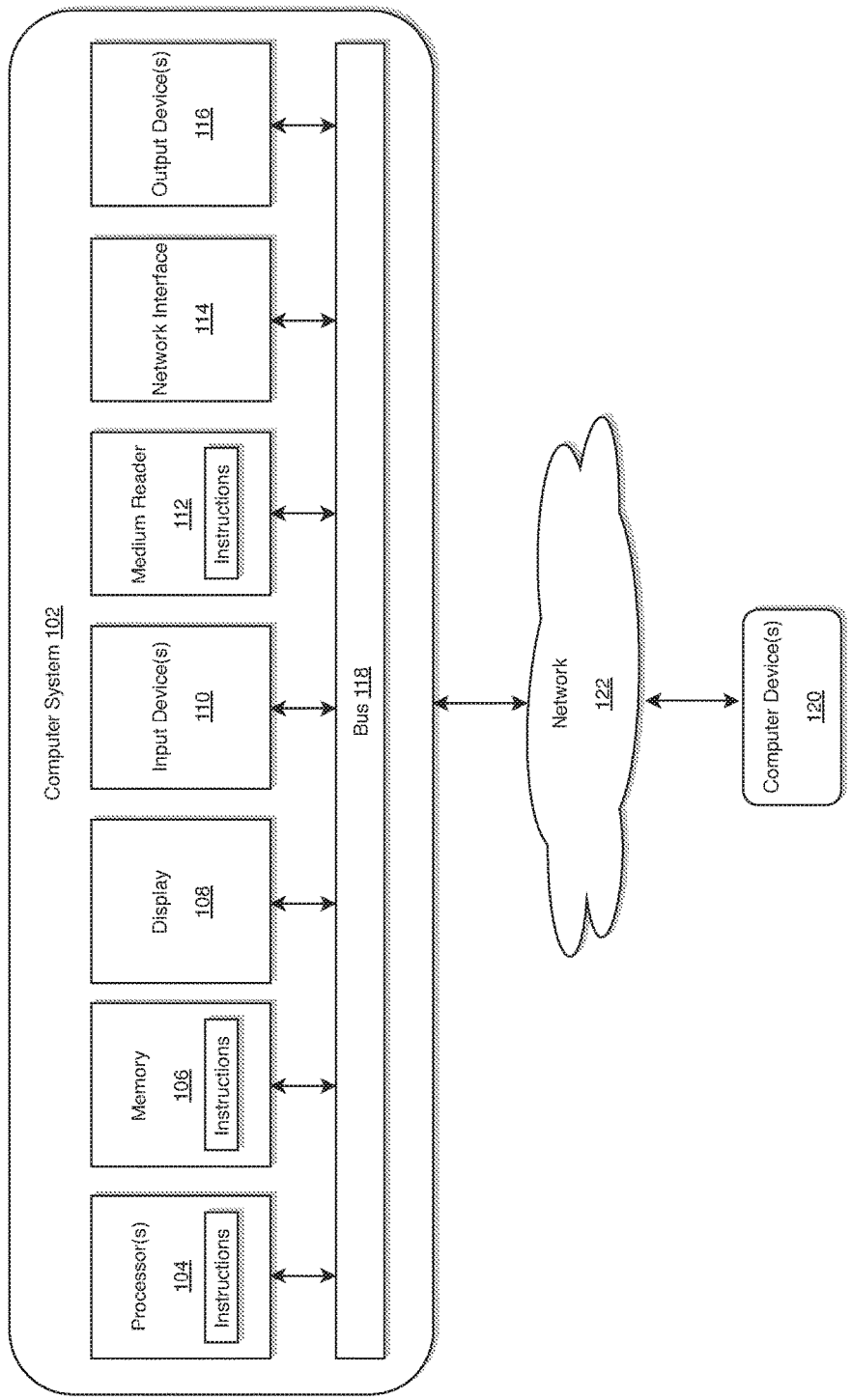
FIG. 1 illustrates a computer system for implementing a real-time fraud machine learning module in accordance with an exemplary embodiment.

Through one or more of its various aspects, embodiments and/or specific features or sub-components of the present disclosure, am intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a real-time fraud machine learning module (RTFMLM) to improve fraud detection accuracy and reduce false-positives by using cross channel data and real-time aggregates from various channel data sources. In addition, various embodiments provide optimized processes of implementing a real-time fraud machine learning module (RTFMLM), thereby spotting, in real-time, patterns and irregularities in customer behaviors/activities, or fraudulent transactions more efficiently and effectively and improve customer experience at point of sale as they experience fewer disruptions.

Figure 2:
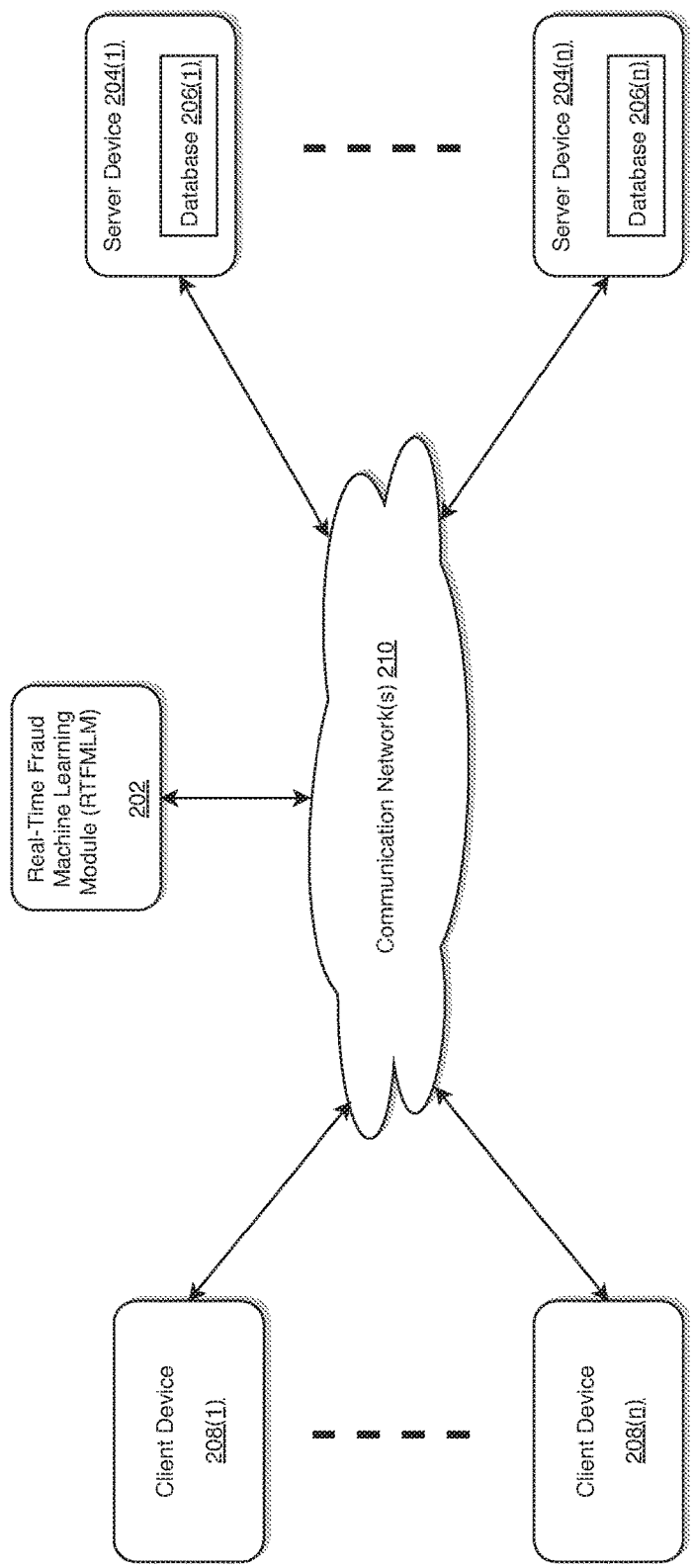
FIG. 2 illustrates an exemplary diagram of a network environment with a real-time fraud machine learning module in accordance with an exemplary embodiment.

Referring to FIG. 2, a schematic of an exemplary network environment 200 for implementing a RTFMLM of the instant disclosure is illustrated.

Conventional fraud detection system, that does not implement a RTFMLM of the instant disclosure, may not be able to process a large amount of data sets and multiple data sources required by machine learning models and may not be able to execute the models in real-time using transaction data from various products and channels. This is because, conventional fraud models are typically deployed on expensive, centralized mainframe computers handing only a single source of data and may not be frequently updated because models had to be manually recoded.

According to exemplary embodiments, the above-described problems associated with conventional approach of executing machine learning models may be overcome by implementing RTFMLM 202 as illustrated in FIG. 2. The RTFMLM 202 may be the same or similar to the computer system 102 as described with respect to FIG. 1. The RTFMLM 202 may store one or more applications that can include executable instructions that, when executed by the RTFMLM 202, cause the RTFMLM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTFMLM 202 itself, may be located in virtual server(s) running in a cloud-based computing environment rather than being tied to one or more specific physical network computing devices. Also, the application(s) may be running in one or more virtual machines (VMs) executing on the RTFMLM 202. Additionally, in one or more embodiments of this technology, virtual machine(s) running on the RTFMLM 202 may be managed or supervised by a hypervisor.

In the network environment 200 of FIG. 2, the RTFMLM 202 is coupled to a plurality of server devices 204(1)-204(n) that hosts a plurality of databases 206(1)-206(n), and also to a plurality of client devices 208(1)-208(n) via communication network(s) 210. A communication interface of the RTFMLM 202, such as the network interface 114 of the computer system 102 of FIG. 1, operatively couples and communicates between the RTFMLM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

Figure 3:
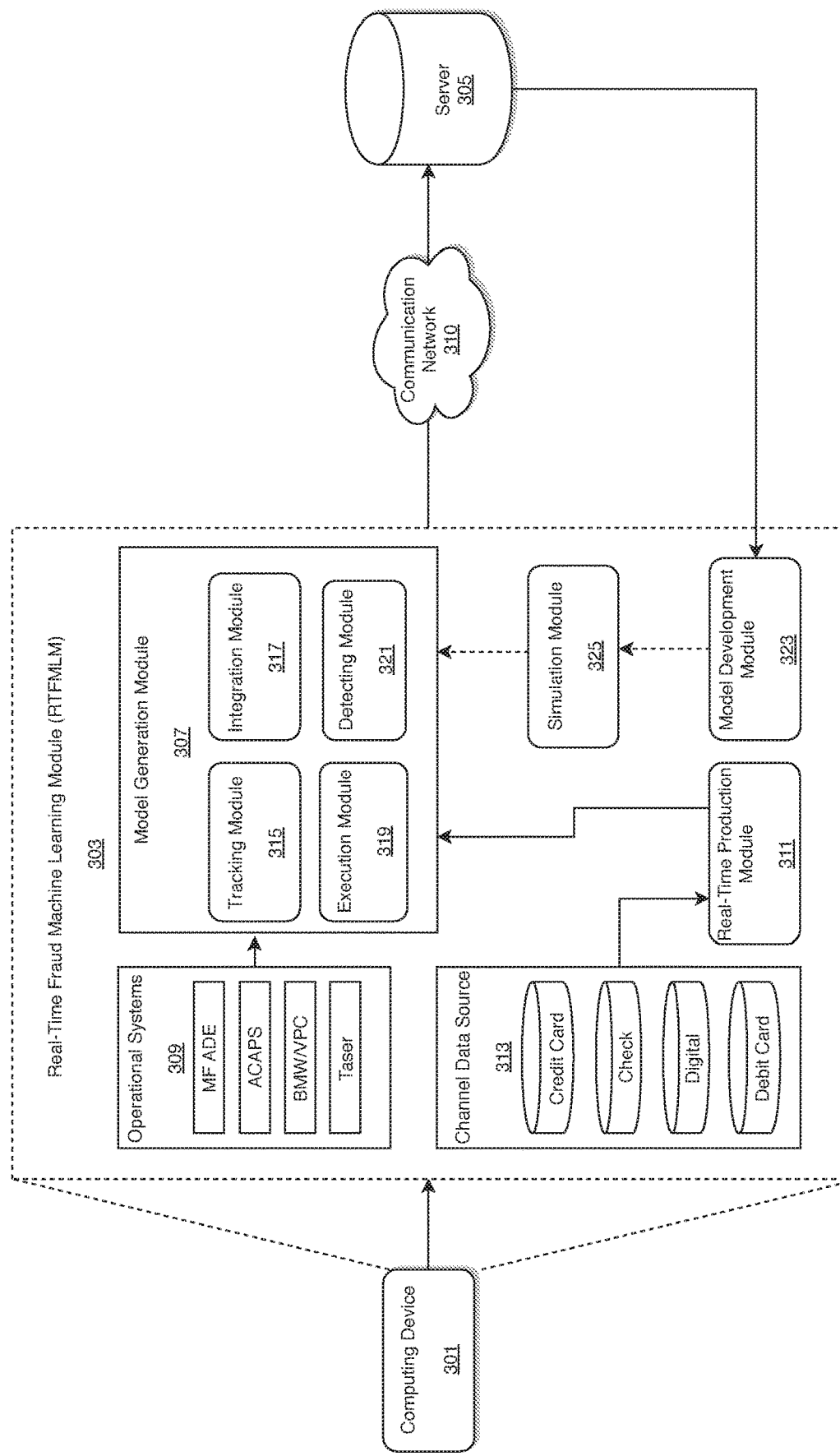
FIG. 3 illustrates a system diagram for implementing a real-time fraud machine learning module in accordance with an exemplary embodiment.

The communication network(s) 210 may be the same or similar to the network 122 as described with respect to FIG. 1, although the RTFMLM 202, the server devices 204(1)-204(n), and/or the client devices 208(1)-208(n) may be coupled together via other topologies. Additionally, the network environment 200 may include other network devices such as one or mom routers and/or switches, for example, which are well known in the art and thus will not be described herein. This technology provides a number of advantages including methods, non-transitory computer readable media, and RTFMLMs that significantly decreased time to deploy fraud models with an automated deployment and the ability to run models simultaneously by eliminating the need to manually recode model changes. This is made possible by using, according to exemplary embodiments, latest open source tools and following industry practices to migrate models from development to production using, for example, model serialization in predictive model markup language (PMML)/Booster file formats instead of recoding. The RTFMLMs, according to exemplary embodiments may also use Casandra based operational data store, across multiple data centers/sources (see, e.g., channel data source 313 as illustrated in FIG. 3) with real-time replication for business continuity, to track and use real-time customer behaviors/activities arising from e.g., card usage in the middle of the transaction authorization process. This technology also provides real-time simulation environment for enhanced model training and upgrades which will described in detail below with reference to FIG. 3.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTFMLM 202 may be a standalone device or integrated with one or more other devices or apparatuses, such as one or more of the server devices 204(1)-204(n), for example. In one particular example, the RTFMLM 202 may include or be hosted by one of the server devices 204(1)-204(n), and other arrangements are also possible. Moreover, one or more of the devices of the RTFMLM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTFMLM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RTFMLM 202 that may efficiently detect fraudulent transactions in real time. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The implementation of the RTFMLM 202, according to exemplary embodiments, into a proprietary distributed fraud machine learning production platform owned by the instant assignee has shown significant savings in fraud loss. Instant assignee currently holds one of the largest credit card portfolios in the industry, with approximately 61 MM active accounts, 600 MM transactions, and $50 Billion in sales value monthly and net fraud losses across amount to approximately $400 M annually. However, the implementation of the RTFMLM 202, according to exemplary embodiments, has reduced about $50 MM in fraud losses and is projected to save up to $100 MM annually in fraud losses across all channels, for example, card fraud channel, card application fraud channel, first payment default channel, check fraud channel, debit card fraud channel, card portfolio bust-out channel, etc. within a year. The implementation of the RTFMLM 202 of the instant disclosure may allow 450K fewer false positive declines leading to an increased customer spend of about $480 M per annum. Some exemplary benefits of implementation of the RTFMLM 202 of the instant disclosure may include: ability to leverage more data sources for transactions in real time, executing up to 1,200 transactions per second with less than 100 millisecond SLA; improved fraud detection accuracy and reduced false-positives by using cross channel data and real-time aggregates; increased capability to spot patterns and irregularities in customer behaviors/activities arising from transactions, or fraud, more efficiently and effectively; improved customer experience at point of sale as they experience fewer disruptions.

The client devices 208(1)-208(n) may run interface applications, such as standard web browsers or standalone client applications, which may provide an interface to communicate with the RTFMLM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RTFMLM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTFMLM 202, the server devices 204(1)-204(n), or the client devices 208(1)-208(n), for example, may be configured to operate as virtual instances on the same physical machine. For example, one or more of the RTFMLM 202, the server devices 204(1)-204(n), or the client devices 208(1)-208(n) may operate on the same physical device rather than as separate devices communicating through communication network(s) 210. Additionally, there may be more or fewer RTFMLMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

FIG. 3 illustrates a system diagram for implementing a data quality framework module for a protocol buffer messaging in accordance with an exemplary embodiment.

As illustrated in FIG. 3, a computing device 301 may be coupled to a server 305 via a communication network 310 and a RTFMLM 303 may be implemented within the computing device 301. One or more browser applications (browsers) (not shown) may run on the computing device 301. The communication network 310 may be the communication network 210 as disclosed herein with reference to FIG. 2. Unlike the conventional fraud detection systems, the computing device 301 of the instant disclosure may be configured to implement a RTFMLM 303 that may improve fraud detection accuracy in real time (e.g., within 130 ms) and reduce false-positives by using cross channel data and real-time aggregates from various channel data sources.

The computing device 301 may be the same or similar to any one of the client devices 208(1)-208(n) as described with respect to FIG. 2, including any features or combination of features described with respect thereto. The RTFMLM 303 may be the same or similar to the RTFMLM 202 as described with respect to FIG. 2, including any features or combination of features described with respect thereto.

According to exemplary embodiments, the RTFMLM 303 may include a model generation module 307, one or more operational systems/applications 309, real-time production module 311, one or more channel data source 313, a model development module 323, and a simulation module 325. As illustrated in FIG. 3 the model generation module 307 may include a tracking module 315, an integration module 317, an execution module 319, and a detecting module 321.

According to exemplary embodiments, each of the model generation module 307, the one or more operational systems/applications 309, the real-time production module 311, the one or more channel data source 313, the model development module 323 and a simulation module 325 of the RTFMLM 303 may be implemented by microprocessors or similar, and may be programmed using software (e.g., microcode) to perform various functions discussed herein and may optionally be driven by firmware and/or software. Alternatively, each of the model generation module 307, the one or more operational systems/applications 309, the real-time production module 311, the one or more channel data source 313, the model development module 323 and a simulation module 325 of the RTFMLM 303 may be implemented by dedicated hardware, or as a combination of dedicated hardware to perform some functions and a processor (e.g., one or more programmed microprocessors and associated circuitry) to perform other functions.

According to exemplary embodiments, each of the tracking module 315, the integration module 317, the execution module 319, and the detecting module 321 of the model generation module 307 may be implemented by microprocessors or similar, and may be programmed using software (e.g., microcode) to perform various functions discussed herein and may optionally be driven by firmware and/or software. Alternatively, each of the tracking module 315, the integration module 317, the execution module 319, and the detecting module 321 of the model generation module 307 may be implemented by dedicated hardware, or as a combination of dedicated hardware to perform some functions and a processor (e.g., one or more programmed microprocessors and associated circuitry) to perform other functions.

According to exemplary embodiments, the RTFMLM 303 may be implemented to detect fraudulent transactions in real-time by utilizing one or more processors and one or more memories as disclosed above. For example, model generation module 307 may generate a plurality of machine learning models to be executed to detect transactional frauds in real time. Transactional frauds may include frauds in credit card transactions, debit card transactions, digital/online transactions, check transactions, etc. Each of the machine learning models may be configured to run simultaneously in parallel independent of each other.

The model generation module 307 utilizes transactional data from operational systems 309. According to exemplary embodiments, the operational systems 309 may include applications/systems such as MF ADE (mainframe authorization decision engine), ACAPS (automated credit application processing system), BMW/VPC, and Taser. Each of these the operational systems 309 may represent different types of use cases (e.g., for different types of models) to detect fraudulent transactions. For example, the MF ADE is an operational system that would be providing credit card transactions data for credit card fraud machine learning detection model generated by the model generation module 307. The ACAPS is an operational system that may provide data for first payment default machine learning model, or fraudulent credit application machine learning model generated by the model generation module 307. The BMW/VPC is an operational system that may provide data for check fraud detection machine learning model. The Taser is an operational system that may provide data for debit card fraud machine learning model generated by the model generation module 307. The RTFMLM 303, according to exemplary embodiments, may be configured such that each of these machine learning models generated by the model generation module 307 may be executed in real time (e.g., within a predetermined time in a range of 130 ms to 1s, but the disclosure is not limited thereto) simultaneously in parallel independent of each other eliminating the need to manually recode model changes.

According to exemplary embodiments, how the model generation module 307 generates a credit card fraud machine learning detection model will be explained below. It should be understood that similar processes may also be implemented by the model generation module 307 to generate, for example, a check fraud detection machine learning model, a debit card fraud machine learning model, and a fraudulent credit application machine learning model, etc.

According to exemplary embodiments, the model generation module 307 may utilize predictive model markup language (PMML) as an open source framework to model each of said plurality of machine learning models. The PMML is an XML-based language that enables the definition and sharing of predictive models between applications. A predictive model is a statistical model that may be designed to predict the likelihood of target occurrences given established variables or factors received from the operational systems 309. It may be important to use PMML because it may allow model to be updated frequently. For example, persons committing frauds are constantly coming up with techniques to evade detection. The PMML booster file format may allow the model to be updated frequently by adding codes to react to those techniques and identify frauds. Thus, PMML booster file format allows those model changes to be deployed directly to simulation (e.g., simulation module 325) or execution (e.g., execution module 319) environments after appropriate control perspective implemented by the RTFMLM 303. As a result, according to exemplary embodiments, there is no recoding required on RTFMLM 303 platform, thereby significantly improving fraud detection speed compared to conventional fraud detection systems. According to exemplary embodiments, the open source is used in a distributed fashion to create the machine learning models.

Alternatively, the model generation module 307 may also utilize any one of the following as an open source framework to model each of said plurality of machine learning models: Java Spring Boot, Cassandra, LogStash, Kibana, and Kafka.

The real-time production module 311 generates historical aggregate data in real time based on prior transaction activities (e.g., credit card transaction activities) of a customer from a plurality of databases included in the channel data source 313. Historical aggregates (historical data) may be very important (crucial) for all machine learning models created by the model generation module 307. According to exemplary embodiments, historical data may include, for example, how many transactions were approved within the last 24 hours or 48 hours; how many of those transactions have been identified as fraud that has been caught within the last 24 hours or 48 hours; whether the customer ever shopped in this Zip code, store, mall, etc. These are different matrices that the model generation module 307 may require to generate derived variables based on these historical aggregates. According to exemplary embodiments, the real-time production module 311 may use Cassandra (another open source) to calculate all these historical aggregates in real time (e.g., within 130 ms). For example, if a customer initiates a purchase transaction in New York using his/her credit card at point of sale (POS), and within two minutes another purchase transaction occurred in Washington, D.C., the real-time production module 311 may automatically detect in real time that these two transactions are not practically possible for customer. Accordingly, the real-time production module 311 triggers a fraud alert to the model generation module 307.

According to exemplary embodiments, the model generation module 307 utilizes real-time transaction data received from the operational systems 309 with real-time historical data aggregates generated by the real-time production module 311 to detect these frauds in real time. The exemplary embodiments require using up to the minute historical data aggregates. Conventional fraud detection systems typically calculate these historical data on a per day basis and load these data as batch mode. Thus, typically, it was only using data for fraud transactions that happened up until yesterday. So, whatever fraud may happen today, the conventional fraud detection systems are not able to include them in the historical data to calculate the derived variables. Contrary to conventional techniques, utilizing the RTFMLM 303 of the instant disclosure, one can track fraud up to the last one minute or one second of transaction (customer behavior).

For example, the tracking module 315 may track, in real time, activities of the customer during a new transaction authorization process and may generate a real-time transaction data. The integration module 317 may integrate the real-time transaction data with the historical aggregate data generated by the real-time production module 311. The execution module 321 may execute each of the machine learning models in real time using the integrated real-time transaction data and the historical aggregate data to generate a fraud score. The detecting module 321 determines, in real time, whether the new transaction is fraudulent based on the generated fraud score. For example, RTFMLM 303 may authorize the new transaction based on a determination that the fraud score is a value that is at or above a predetermined threshold and may deny the new transaction based on a determination that the fraud score is a value that is below a predetermined threshold.

According to exemplary embodiments, the execution module 319 may utilize Spring Boot framework an open source. The RTFMLM 303 may use commodity hardware to execute the machine learning models generated by the model generation module 307. According to exemplary embodiments, the RTFMLM 303 may utilize a plurality of servers (e.g., forty servers, but the disclosure is not limited thereto). These servers are independent of each other having no master slave relationships. All of these plurality of servers may read on the transactions independently of each other in parallel. For example, if one server breaks down, the RTFMLM 303 may obtain transaction data from the other servers. According to exemplary embodiments, additional servers may be added to provide transactional data. These servers may run in a distributed mode so that the RTFMLM 303 may easily scale up or scale down depending on the need of processing transactions.

According to exemplary embodiments, the model generation module 307 may update each of the plurality of machine learning models by automatically incorporating model changes, due to the integration of the real-time transaction data with the real-time historical aggregate data, without recoding the model changes. The model generation module 307 may generate new machine learning models based on the model changes. The new machine learning models, model variables, and fraud scores generated by the RTFMLM 303 may be stored onto one or more servers 305. The model development module 323 may receive these new models from the server 305 via communication network 310 and the simulation module 325 may execute these new machine learning models in a simulation mode prior to integrating these models into the RTFMLM 303.

For example, for future model training, the new machine learning models, model variables, and fraud scores generated by the RTFMLM 303 may be stored onto one or more servers 305 and use these data in model development and then train the model.

Whenever a new machine learning model is generated, first it is checked by the simulation module 325 whether the new model is working properly. After running/executing the new model by the simulation module 325 for several times it is determined whether the new model is running as expected. After determining that the new model is running as expected, the new model may be integrated into the RTFMLM 303 production environment. The new model may be utilized to retrain each of the machine learning models in real time.

Figure 4:
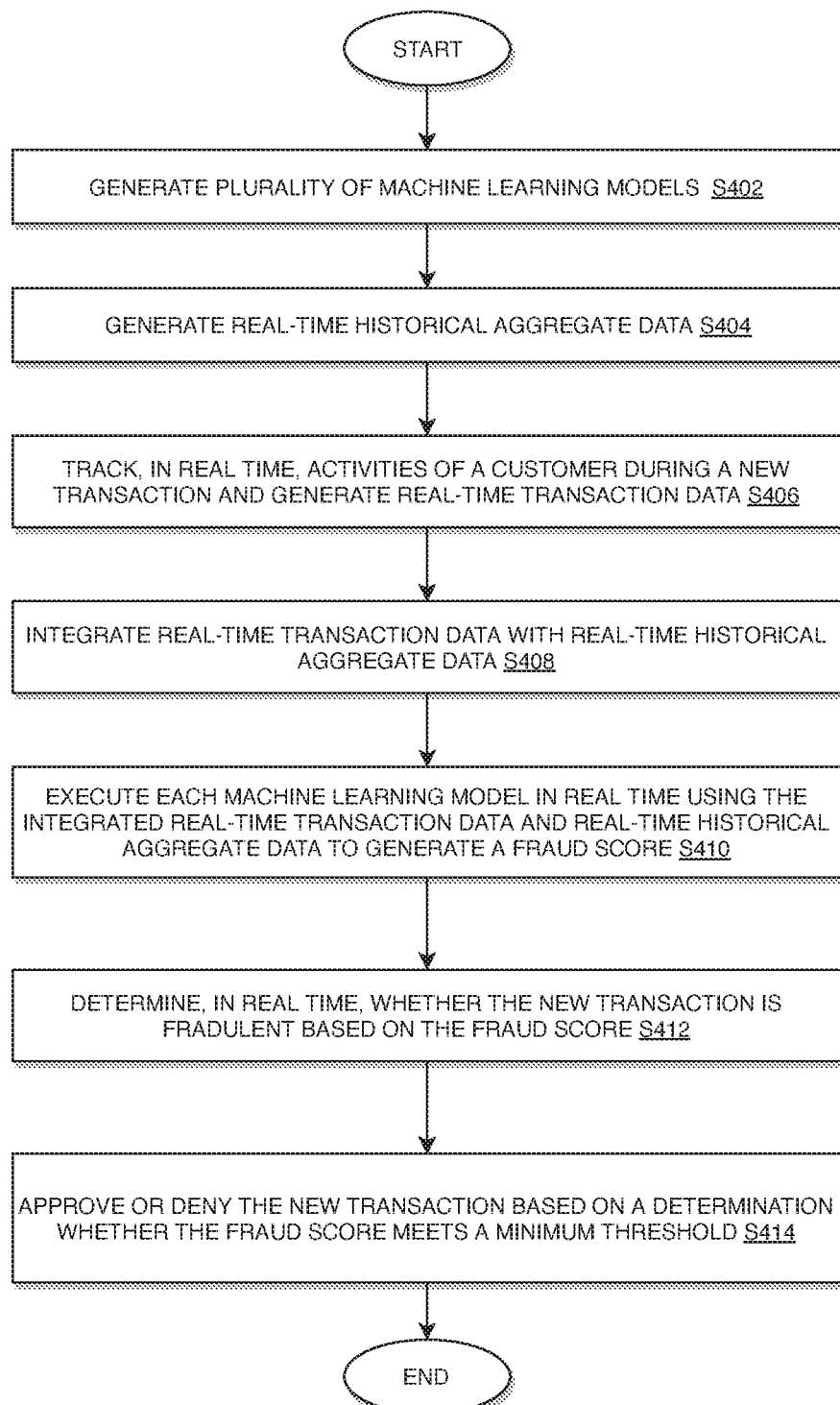
FIG. 4 illustrates a flow chart for implementing a real-time fraud machine learning module in accordance with an exemplary embodiment.

FIG. 4 illustrates a flow chart for implementing a real-time fraud machine learning model execution module to detect fraudulent transactions in real-time.

In the process of FIG. 4, at step S402, a model generation module may generate a plurality of machine learning models. Each of the machine learning models may be configured to run simultaneously in parallel independent of each other. According to exemplary embodiments, the model generation module may be the model generation module 307 as illustrated in FIG. 3.

At step S404, a real-time production module may generate historical aggregate data in real time based on prior transaction activities of a customer from a plurality of databases for transactions. According to exemplary embodiments, the real-time production module may be the real-time production module 311 as illustrated in FIG. 3.

At step S406, a tracking module may track, in real time, activities of the customer during a new transaction authorization process and may generate a real-time transaction data. According to exemplary embodiments, the tracking module may be the tracking module 315 as illustrated in FIG. 3.

At step S408, an integration module may integrate the real-time transaction data with the historical aggregate data. According to exemplary embodiments, the integration module may be the integration module 317 as illustrated in FIG. 3.

At step S410, an execution module may execute each of the machine learning models in real time using the integrated real-time transaction data and the historical aggregate data to generate a fraud score. According to exemplary embodiments, the execution module may be the execution module 319 as illustrated in FIG. 3.

At step S412, a determination module may determine, in real time, whether the new transaction is fraudulent based on the generated fraud score. According to exemplary embodiments, the determination module may be the detecting module 321 as illustrated in FIG. 3.

At step S414, determination module may approve or deny the new transaction based on a determination whether the fraud score meets a minimum threshold. For example, the RTFMLM 303 may authorize the new transaction based on a determination by the detecting module 321 that the fraud score is a value that is at or above a predetermined threshold and may deny the new transaction based on a determination by the detecting module 321 that the fraud score is a value that is below a predetermined threshold.

According to exemplary embodiments as disclosed above in FIGS. 1-4, technical improvements effected by the instant disclosure may include integrating existing open source frameworks (e.g., Java Spring Boot, Model serialization with XML/Booster files, and Cassandra as Operation data store) and commodity hardware in a manner to create an end to end architecture for high performant POS (e.g., card POS) fraud model execution. For example, innovative improvement may also involve linking existing operational systems with the model execution engines generated by the RTFMLMs of the instant disclosure that may provide the ability to seamlessly deploy machine learning models, swap decision tree booster files without technology intervention, run champion/challenger models as well as changing production transaction volumes for each model seamlessly without recoding.

According to exemplary embodiments, the RTFMLMs of the instant disclosure may utilize Spring Boot, an open source Java based micro services framework, to write the core engine and associated services, thus enabling easy deployment, horizontal scalability, and compatible with future container and cloud technology with minimal configuration changes. Implementation of the RTFMLMs of the instant disclosure may significantly decrease time to deploy fraud models with an automated deployment and the ability to run models simultaneously by eliminating the need to manually recode model changes.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a real-time fraud machine learning module (RTFMLM) to detect fraudulent transactions by utilizing one or more processors and one or more memories, the method comprising:
    implementing, by one or more processors, the RTFMLM in servers that are distributed across different communication networks; and
    configuring, by the one or more processors, the RTFMLM to:
        generate, via an open source framework, a plurality of machine learning models, each of said plurality of machine learning models is configured to run simultaneously in parallel and independent of each other;
        generate historical aggregate data based on prior transaction activities of a customer from a plurality of databases for transactions;
        in real-time, track activities of the customer during a new transaction authorization process of an operational system and utilize data of the new transaction authorization process to generate a transaction data, wherein real-time is any amount of time that is less than 130 milliseconds, and
        wherein the operational system includes at least one operational system from among a mainframe authorization decision engine (MF ADE), an automated credit application processing system (ACAPS), BMWNPC, and Taser;

integrate the transaction data with the historical aggregate data;

automatically update, via the open source framework, each of said plurality of machine learning models by incorporating model changes, due to the integration of the transaction data with the historical aggregate data, without recoding the model changes;

generate, via the open source framework, new machine learning models based on the model changes;

store at least one of each of the new machine learning models onto one or more of the servers that are distributed across the different communication networks;

execute at least one of the new machine learning models in a simulation mode;

after executing the at least one of the new machine learning models in the simulation mode more than twice, determine whether the at least one of the new machine learning models is running as expected;

in response to determining that the at least one of the new machine learning models is running as expected, integrate the at least one of the new machine learning models into the RTFMLM and utilize the at least one of the new machine learning models to retrain at least one of said plurality of machine learning models;

execute said plurality of machine learning models using the integrated transaction data and the historical aggregate data to generate a fraud score; and determine whether a new transaction is fraudulent in real-time and based on the generated fraud score, wherein:

the new transaction is authorized when the fraud score is a value that is at or above a predetermined threshold, and the new transaction is denied when the fraud score is a value that is below the predetermined threshold.

2. The method according to claim 1, wherein the generation of said plurality of machine learning models comprises:

using predictive model markup language (PMML) as an open source framework to model each of said plurality of machine learning models.

3. The method according to claim 1, wherein the generation of said plurality of machine learning models comprises:

using any one of the following as an open source framework to model each of said plurality of machine learning models: Java Spring Boot, Cassandra, LogStash, Kibana, and Kafka.

4. The method according to claim 1, further comprising configuring, by the one or more processors, the RTFMLM to:

update each of said plurality of machine learning models by automatically incorporating model changes by using a predictive model markup language (PMML) as an open source framework;

generate a new model based on the updating; and execute the new model in a simulation mode prior to executing each of said plurality of machine learning models.

5. The method according to claim 1, further comprising configuring, by the one or more processors, the RTFMLM to:

update each of said plurality of machine learning models by automatically incorporating model changes by using a predictive model markup language (PMML) as an open source framework;

generate a new model based on the updating;

store the new model onto a memory; and utilize the new model to retrain each of said plurality of machine learning models.

6. A system for implementing a real-time fraud machine learning module (RTFMLM) to detect fraudulent transactions, the system comprising:

one or more processors; and a memory, wherein the one or more processors is configured to implement the RTFMLM in server devices that are distributed across different communication networks, and the RTFMLM is configured to:

generate, via an open source framework, a plurality or machine learning models, each of said plurality of machine learning models is configured to run simultaneously in parallel and independent of each other;

generate historical aggregate data based on prior transaction activities of a customer from a plurality of databases for transactions;

in real-time, track activities of the customer during a new transaction authorization process of an operational system and utilize data of the new transaction authorization process to generate a transaction data, wherein real-time is any amount of time that is less than 130 milliseconds, and wherein the operational system includes at least one operational system from among a mainframe authorization decision engine (MF ADE), an automated credit application processing system (ACAPS), BMWNPC, and Taser;

integrate the transaction data with the historical aggregate data;

automatically update, via the open source framework, each of said plurality of machine learning models by incorporating model changes, due to the integration of the transaction data with the historical aggregate data, without recoding the model changes;

generate, via the open source framework, new machine learning models based on the model changes;

store at least one of each of the new machine learning models onto one or more of the servers that are distributed across the different communication networks;

execute at least one of the new machine learning models in a simulation mode;

after executing the at least one of the new machine learning models in the simulation mode more than twice, determine whether the at least one of the new machine learning models is running as expected;

in response to determining that the at least one of the new machine learning models is running as expected, integrate the at least one of the new machine learning models into the RTFMLM and utilize the at least one of the new machine learning models to retrain at least one of said plurality of machine learning models;

execute said plurality of machine learning models using the integrated transaction data and the historical aggregate data to generate a fraud score and store the fraud score into the memory; and determine whether a new transaction is fraudulent in real-time and based on the generated fraud score, wherein:

the new transaction is authorized when the fraud score is a value that is at or above a predetermined threshold, and the new transaction is denied when the fraud score is a value that is below the predetermined threshold.

7. The system according to claim 6, wherein the RTFMLM is further configured to: model each of said plurality of machine learning models by using predictive model markup language (PMML) as an open source framework.

8. The system according to claim 6, wherein the RTFMLM is further configured to: model each of said plurality of machine learning models by using any one of the following as an open source framework: Java Spring Boot, Cassandra, LogStash, Kibana, and Kafka.

9. The system according to claim 6, wherein the RTFMLM is further configured to:

update each of said plurality of machine learning models by automatically incorporating model changes by using a predictive model markup language (PMML) as an open source framework;

generate a new model based on the updating; and execute the new model in a simulation mode prior to executing each of said plurality of machine learning models.

10. The system according to claim 6, wherein the RTFMLM is further configured to:

update each of said plurality of machine learning models by automatically incorporating model changes by using a predictive model markup language (PMML) as an open source framework;

generate a new model based on the updating;

store the new model onto the memory; and utilize the new model to retrain each of said plurality of machine learning models.

11. A non-transitory computer readable medium configured to store instructions for implementing a real-time fraud machine learning module (RTFMLM) to detect fraudulent transactions, wherein when executed, the instructions cause one or more processors to perform the following:

implementing the RTFMLM in servers that are distributed across different communication networks; and configuring the RTFMLM to perform the following:

generating, via an open source framework, a plurality of machine learning models, each of said plurality of machine learning models is configured to run simultaneously in parallel and independent of each other;

generating historical aggregate data based on prior transaction activities of a customer from a plurality of databases for transactions;

in real-time, tracking activities of the customer during a new transaction authorization process of an operational system and utilizing data of the new transaction authorization process to generate a transaction data, wherein real-time is any amount of time that is less than 130 milliseconds, and wherein the operational system includes at least one operational system from among a mainframe authorization decision engine (MF ADE), an automated credit application processing system (ACAPS), BMWNPC, and Taser;

integrating the transaction data with the historical aggregate data;

automatically updating, via the open source framework, each of said plurality of machine learning models by incorporating model changes, due to the integration of the transaction data with the historical aggregate data, without recoding the model changes;

generating, via the open source framework, new machine learning models based on the model changes;

storing at least one of each of the new machine learning models onto one or more of the servers that are distributed across the different communication networks;

executing at least one of the new machine learning models in a simulation mode;

after executing the at least one of the new machine learning models in the simulation mode more than twice, determining whether each of the new machine learning models is running as expected;

in response to determining that the at least one of the new machine learning models is running as expected, integrating the at least one of the new machine learning models into the RTFMLM and utilizing the at least one of the new machine learning models to retrain at least one of said plurality of machine learning models;

executing said plurality of machine learning models using the integrated transaction data and the historical aggregate data to generate a fraud score; and determining whether a new transaction is fraudulent in real-time and based on the generated fraud score, wherein:

the new transaction is authorized when the fraud score is a value that is at or above a predetermined threshold, and the new transaction is denied when the fraud score is a value that is below the predetermined threshold.

12. The non-transitory computer readable medium of claim 11, wherein the instructions, when executed, further cause the one or more processors to configure the RTFMLM to perform the following:

using predictive model markup language (PMML) as an open source framework to model each of said plurality of machine learning models.

\* \* \* \* \*